March 18, 1941. L. B. VERNON ET AL 2,234,993
PROCESS OF MANUFACTURING ARTICLES OF THERMOPLASTIC SYNTHETIC RESINS
Filed Feb. 6, 1937
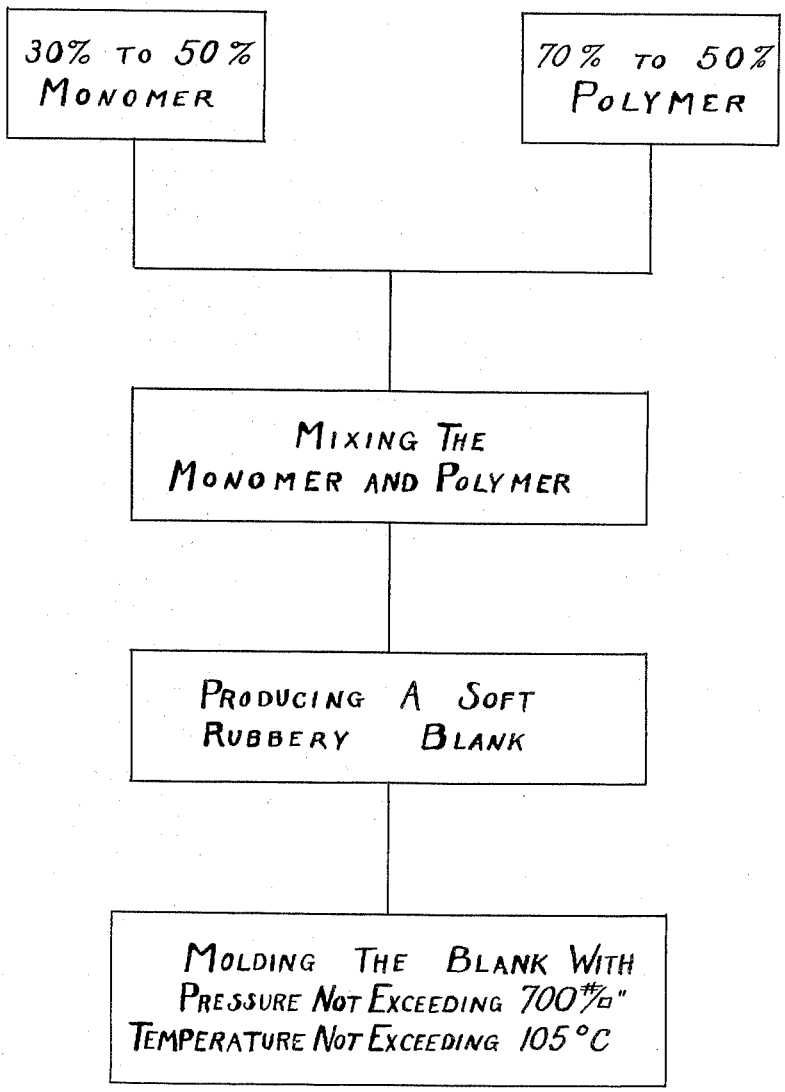

Patented Mar. 18, 1941

2,234,993

UNITED STATES PATENT OFFICE 2,234,993

PROCESS OF MANUFACTURING ARTICLES OF THERMOPLASTIC SYNTHETIC RESINS

Lester B. Vernon, Beaver, and Harold M. Vernon, Pittsburgh, Pa., assignors to The Vernon-Benshoff Company, Pittsburgh, Pa., a corporation of Pennsylvania Application February 6, 1937, Serial No. 124,460

2 Claims. (Cl. 18—55)

This invention relates to a useful synthetic resin for molding articles of various kinds including oral restorations, such as dentures, partials, bridges, lingual bar restorations and interdental splints. Its usefulness rests upon two important features which we believe to be original with us: (1) it is pre-softened, a gum or jelly-like substance, hence flexible: and (2) it possesses a non-homogeneous physical structure, made to unite two distinct physical structures within a single mass. These two features, flexibility and duel structure, give rise to a number of important advantages in our resin which will be shown as peculiarly adapting it to dental restorations and the process of molding the same.

In making dental restorations there is a peculiar molding problem different from almost any other. Each restoration must be made from its own individual mold. No two are the same and the mold can be used only once. Hence it is not feasible to construct a first-class, standard metal mold to which relatively high heat and pressure can be applied safely, as is done where many identical articles are to be turned out.

And in making dental restoration molds, the dentist is confined to materials that enable the mold to be quickly and accurately made from casts and impressions taken from the mouth. In the present dental art he is confined to gypsum plaster and gypsum plaster-base materials for his mold. In consequence, the substance of which he makes a dental restoration must be one that can be successfully molded in such plaster or plaster-base materials with their well-known limitations. Indeed, it has long been recognized that many difficulties and failures in dental restoration construction arise from the behavior of such plaster.

Now a dental restoration material should have the following characteristics: resistance to action of oral secretions and foods taken into the mouth; freedom from taste or odor; hardness; tensile, flexural and impact strength; density; minimum contraction and expansion; it should inhibit bacterial growth; surface hardness to take and maintain a high polish; color harmony with the tissues of the mouth; and easy repairability. But in addition to these, a primary requisite is that it be capable of being successfully molded in plaster or plaster-base materials.

Hence it is recognized that there are many plastic resins, which though having suitable properties in all other respects, are denied a place in dentistry solely because they are too difficult to mold in accordance with necessary dental facilities and technics.

The limitations of gypsum plaster, well known to all dentists, are its softness and its unfavorable behavior under heat and pressure. It is too soft to withstand a very great pressure even at room temperature, and with elevation above room temperature, its softness increases measurably. Thermal changes produce still further unfavorable effects in plaster, viz., marked expansion and contraction. While a temperature of several hundred degrees completely disintegrates plaster; even in the range from 100° to 200° C. a material loss of compressive strength takes place and also material dimensional changes occur. Emphasis is given to these facts because it happens that practically all the plastics now used in dentures must be molded within that range.

The harmful effect of elevated temperatures on plaster, moreover, is not only a matter of degree but of duration as well. Thus a relatively low temperature, not harmful for a few minutes, may produce marked weakening or distortion if prolonged for two hours or more.

As regards dental restoration molding, these deficiencies of plaster give rise to frequent failures or defects because in addition to having softening or curing temperatures between 100° and 200° C., practically all the plastics now in use require more or less pressure to mold them, this in some cases being as high as 1000 pounds per square inch. Besides, it is required that these temperatures and pressures, either one or both, be maintained for periods varying from one to two and one-half hours. Among various failures or defects frequently resulting are the following: breakage of the mold, breakage of the teeth imbedded in the mold, movement of the teeth out of their proper relation, distortion of the restoration so that it does not truly conform to the cast or die of the mouth, the movement of clasps, bars or other metal attachments in relation to abutment teeth, and the setting up of internal strains which result in warpage or breakage in service.

Due to the deficiencies of plaster, therefore, it has long been conceded that advance in the art lies in the direction of developing a material capable of being molded with the minimum of heat and pressure and in the shortest period of exposure to them. Indeed from what is known of plaster's weaknesses, it is obviously desirable that molding temperature should not exceed 100° C., pressure not above six or seven hundred pounds per square inch, and length of treatment not above one hour.

It will be seen that in the choice of the material the dentist has had to keep in mind its workability in the plaster mold as much as its other properties such as hardness, strength, stability, compatibility with tissue, aesthetic properties, etc. And to all the materials now available, there are some one or more objections, based upon one or more of these various factors. A few typical examples of objections, past or present, will be given.

Vulcanite rubber, long used by the dental profession, is objected to on aesthetic grounds and because it is unsanitary. Besides this, its successful vulcanization requires too long an exposure of the mold to too high a temperature, so that both distortion and strains result. Though objecting to it on these grounds, a large proportion of the dentists reluctantly continue to use it as the least of all possible evils, as there has been much disappointment with the synthetic resins more recently exploited.

In an attempt to improve dental restorations in the respects above mentioned, resort was had to pyroxylins. A large number were developed only to be largely abandoned because of several deficiencies. The restorations possessed taste and smell, many warped badly, they proved more or less soluble in oral fluids, lacked chemical stability, irritated tissue, and discolored.

The vinyl resins were used extensively for a time and were abandoned because they lacked flexural strength. The articles broke in service, in many instances snapping in two when no stress was being applied. The vinyls proved very difficult to mold. It being necessary to mold them from blanks or preforms, they required a higher degree of heat and especially a higher pressure than was advisable in plaster molds. The great pressure conferred internal strains which accounted for the frequent breakage in service. It was found also that the vinyl resins frequently pulled away from the necks of the artificial teeth, this being likewise attributed to the strains set up in pressing. The length of time and the care required to mold them, together with the necessity for a special press, contributed to making the vinyl oral restorations more costly than those of rubber or cellulose base. However, it was the high percentage of failures in service that caused their abandonment.

Oral restorations of polymerized styrol have also been tried without success. This resin proved both too weak and brittle. It chipped in cutting and surfaces of the articles crazed in service.

Glycerol-phthalic anhydride resins were given an extensive trial and were abandoned because of the extreme difficulty of molding. The necessities of dental practice and cost considerations require that a restoration be completed within several hours, and it was found necessary to process the glycerol-phthalic resins no less than forty-eight hours to mold them successfully.

The phenol-formaldehyde resins have been extensively used for several years and their deficiencies are generally recognized. Curing in the mold requires several hours at a very carefully regulated temperature. The error of a few degrees high or low means failure of the case. Although an excessive pressure is not required, this resin demands a higher temperature and a longer period of heat than is proper for the plaster-base material of the mold. The resin must be sealed away from all moisture by foiling the case and this requires care and time. The slightest departure from a very exacting technic produces failure in the resin. Among common failures are discoloration, bubbles and brittleness. At best these resins lack both the tensile and flexural strength of well-vulcanized rubber, and are sufficiently brittle that an impact such as a fall to the floor is liable to break them. Being thermosetting they are more difficult to rebase and repair than thermoplastics or rubber. Because of the long-continued high heat of the molding, dimensional changes in the mold make distortions frequent and there are generally internal strains in the oral restorations. For these and other reasons there is too high a percentage of failures to make them definitely successful.

One of the newer thermoplastic resins, polymerized methyl methacrylate, has more recently been introduced as a material for oral restorations. Its chemical stability, its density, resistance to acids and alkalies, and particularly its strength and hardness in the pure, unplasticised state, recommend it as a highly desirable material. In the pure state, however, polymerized methyl methacrylate has been found difficult to mold. It cannot be successfully molded with the usual technics and facilities of the dental laboratory. The temperature at which it softens sufficiently for pressing is beyond the safe limits of the plaster mold, while the pressure required is too high without dangers of breakage and distortions above referred to.

Various plasticisers such as dibutyl phthalate, triacetin, etc., may be added to render the polymer softer, and while these make molding somewhat easier, they still fail to bring it within the safe limits of temperature and pressure which the plaster mold will satisfactorily stand. Even with admixtures of from 15% to 25% by weight of such plasticisers, the polymer still requires temperatures variously from 120° to 130° C., and pressures variously from 1000 to 2000 pounds per square inch to mold the restoration. Both these temperatures and pressures are too high to make molding practicable for the dentist or to avoid distortion and strains.

Moreover, when a plasticiser is added to the polymer, it remains as a residual softening agent, so that to whatever degree it confers moldability upon the polymer, it reduces hardness in the article.

The well-recognized deficiencies of various plastics as applied to the dental art have been briefly reviewed so that it may be observed that, generally speaking, those resins which mold easily in dental plaster are unserviceable in the mouth, while on the other hand, those which have favorable or satisfactory properties for oral service are difficult or impossible to mold with the dentist's ordinary technics and facilities.

We have discovered a means of making the pure methyl methacrylate polymer soft so that it may be molded with the application of very little heat and pressure, both these being well within the limits to which dental plaster can safely be subjected. The pure methyl methacrylate polymer has undoubted advantages as a material for oral restorations, and our discovery not only makes these available but it confers several other advantages not heretofore realized in the dental art. Among these are: a product devoid of internal strain, a greatly shortened and simplified molding technic, improved color properties in the product, a simpler repair and rebasing technic, and a product of greater strength.

And while the above advantages have been conferred upon that class of restorations in which rubber and other resins have been heretofore, we have discovered an equally great or even greater advantage consisting in the fact that our resin can be used to construct a vastly wider range of restorations. In the present dental art it is recognized that plastics, including rubber, are suitable for only a limited application. In general they are available only for full dentures. In that wider range of restorations such as partials, bridges, saddles, skeleton plates, lingual and palatal bars, pontics, metal-attached unilateral and bilateral posterior restorations, interdental splints, occlusal onlay splints and the like, resort is had to metal. This is because in the latter type of restorations, plastics have been found too weak to withstand the strains, or because it has not been possible to keep various necessary metal attachments (such as clasps, bars and wires, etc.) in their delicate alignment while pressing the plastics under the pressure necessary to form the case.

We have found that methyl methacrylate polymer being considerably stronger than other resins, will withstand the strain necessary for partials, bridges, etc., where other resins have failed. And with our method of presoftening the polymer so that adaptation of the resin to metal retainers can be successfully made without extreme heat and pressure, our resin is made available for a much wider field of dental work than could be attempted heretofore with any resin. The effect will be to greatly reduce the cost of many restorations which at present require expensive metals and technics.

The monomers of the methacrylate esters are, generally speaking, light, highly volatile, colorless liquids with pronounced taste and odor. When certain of these monomers are mixed with the methyl methacrylate polymer they cause the latter to soften.

We have discovered that when from two to four parts by weight of a pure methacrylate monomer are slowly mixed with from eight to six parts respectively of the pure methyl methacrylate polymer, the latter preferably being in the form of a dry powder consisting of grains approximately 30 mesh or smaller in size, and the resultant mixture is set aside in a covered vessel for a sufficient period of time, usually three or four days, the polymer grains soak up the monomer as gas or liquid, and the mass goes into a solid gum or jelly of rubbery consistency. Since there is more polymer than monomer, the latter does not dissolve the polymer grains, materially, but the grains remain in the mass substantially retaining their identities and changing only in becoming softer as the monomer penetrates them from outside to center.

As the polymer grains absorb the monomer, the interstitial monomer, which at first was thin, slowly stiffens, partially polymerizing.

When absorption of the monomer by the polymer is complete, the polymer grains are found to have a uniform rubbery consistency. The gum or jelly is then a conglomerate of tough, rubbery grains or particles within a matrix of softer jelly. The major portion of the mass is a framework or skeleton of harder grains surrounded and conglutinated with the softer, amorphous, interstitial jelly. The mass can be pulled out of the vessel in one piece, and though firm and tough, is flexible.

Exposed to open air at room temperature, this gum will slowly harden, but if sealed up and refrigerated, it will retain its softness and rubbery consistency for any desired length of time.

A sheet of it may be cut to a suitable size and shape for the dental mold, or it may be cut into smaller pieces and these placed in the mold as desired.

We have found that a practical variation of the above method of mixing polymer grains with monomer, consists in mixing a refluxed, partially-polymerized monomer of syrupy consistency with the polymer grains. A further variation consists of exposing the grains of polymer to the monomer gas in a closed vessel for ten days to two weeks. Whatever method of combining the polymer and monomer is employed, the resultant gum or jelly is approximately the same.

Although we have found several of the methacrylate monomers suitable softeners for the methyl methacrylate polymer, we prefer the pure methyl methacrylate monomer, and although certain proportions of this monomer variously as thin liquid, viscous semi- liquid or pure gas are specifically described herein as examples, it is to be understood that other monomers in other proportions and forms than those specifically named may alternately or additionally be used without departing from the invention or sacrificing its advantages.

We have referred to pure unplasticised methyl methacrylate as the polymer we prefer for our compound because of its superior strength and hardness. But we have found that the presence of a plasticiser, such, for instance, as dibutyl phthalate, triacetin, etc., while contributing nothing to the successful operation of our invention, and while unnecessary, still does not constitute any material disadvantage. The ultimate effect of a plasticiser will only be to reduce the hardness of the molded article. It is, therefore, understood that a plasticiser may be present in the polymer or in monomeric substance used to soften the polymer without departure from the spirit of the invention.

The advantages of the bifold or agglomerate structure of our resin are these:

(1) Its body or substance being mainly polymer grains only slightly softened by contained monomer, only a slight elevation of temperature is required to restore their original polymeric hardness. The amorphous, interstitial polymer-monomer substance serves as a bond, and being softer, gives the agglomerate flexibility. As a result, the product is molded without straining, and has greater flexural strength by reason of the composite nature of the substance.

(2) Improved coloration of the resin is possible by reason of its non-homogenous structure. Heretofore it has been the practice to distribute tinting dyes or pigments evenly and uniformly through the resins. The purpose of this is to produce a solid, flat tone to simulate the pink of oral tissue. But dentists have long recognized that gum tissue is not of a flat uniform color. Its color really is a synthesis of many tones and colors. The mucosa being made up of myriads of cells and bloodvessels of various colors invested in more or less transparent tissue, close inspection shows that it has a granular, slightly mottled appearance. There are points and streaks of deep red, blue, yellow, many shades of pink, and also white. These various points of color, synthetized by the eye, give oral tissue its character as to tint.

Now dentists have long desired to obtain this mottled and variegated effect in the imitation of natural tissue in their oral restorations. And we find we can admirably accomplish this in our resin. To do so, we blend polymer grains which have previously been impregnated with the various colors desired. Thus, some of the grains are red, some blue, some white, some various pink shades, etc., and these grains are then appropriately blended before treatment with the monomer.

Since the polymer grains do not dissolve in the monomer appreciably, but retain their identities, they also retain their individual colors. Hence there is not a true fusion of the colors in the mass, but only an optical blending, the general pink tint being a composite much as with natural tissue.

Another advantage of our resin is that it enables a denture to be made totally transparent when that is desired, as the untinted methyl methacrylate is of unusual clarity. Or by combining tinted resin with transparent, the product can be made partly tinted, partly clear. Sometimes, for example, it is desired to have the palatal area transparent so that tissue and adaptation can be observed, while these portions more visible (as the anterior buccal area) will be desired colored. Since both transparent and tinted resin can be made by our process, the restoration composite as to color can be made by segregation in the mold of the appropriate resin to the desired areas. In the same way various shades of color can be combined into one product, as for example, varying shades of pink in the lingual, the buccal and the palatal areas, when this is desired.

In coloring our resins it will be evident that many variations as to details of method are possible. Although we prefer to impart the various colors to the polymer grains, leaving the monomeric admixture transparent, variations by way of tinting or whitening the monomer and leaving all or a part of the polymer grains clear are understood to be within the scope of the invention. It will also be evident that with variation of grain sizes and color proportioning, a great variety of tones and color effects will be possible.

In the accompanying drawing we illustrate by means of a flow diagram a practical embodiment of the principles of our process.

*Example 1.*—To granular pure methyl methacrylate polymer, pure methyl methacrylate monomer (specific gravity approximately 0.9497) is slowly added in the ratio of approximately thirty-two parts monomer to sixty-eight parts polymer by weight. This mixture is then allowed to stand in a tightly-covered container for several days, or until the monomer has penetrated and softened the grains of polymer and the mass has assumed the consistency of a dense gum, which while relatively soft and flexible, is tenacious, resists penetration, and is not tacky at ordinary temperatures. Since the tenacity and elasticity of this gum can be overcome under a combination of low pressure and temperature, only from one hundred and fifty to two hundred and fifty pounds per square inch of pressure and from 30° to 82° C. of temperature are required to effect complete conformation to the dental mold when it is put into the flask.

In the manufacture, for instance, of an artificial denture, the mold is prepared in the usual way, the wax pattern is eliminated by immersion and flushing the flask in boiling water, and after lightly drying the mold, its temperature will be approximately 70° to 80° C. The gum is placed immediately in the mold, and the flask closed with light pressure as with vulcanite. If the flask is held tightly closed and set aside, the denture will be fully hard within from two to four hours, but its hardening is greatly accelerated if the flask is again immersed in boiling water or otherwise subjected to a heat of from 90° to 105° C. without the imposition of additional pressure. This slight increase of temperature will harden the denture in from thirty to fifty minutes. It then is removed and polished in the usual way.

While the resin gum is characterized by the strong penetrating odor of the monomer and by its taste, the product, after the molding operation, is devoid of either odor or taste.

*Example 2.*—A gum similar to the one described in Example 1 is conveniently made by heating a quantity of a methacrylate monomer in a closed vessel connected to a reflux condenser until it has assumed a syrupy consistency. This syrup is cooled and the granular methyl methacrylate polymer is added thereto in proportions varying from forty to sixty parts by weight of polymer to sixty to forty parts of monomeric syrup, the exact proportions being dependent upon the fluidity of the monomer syrup and the consistency of the gum desired. The mixture is set aside in a closed vessel for a week as in Example 1. The restoration is molded as in Example 1.

*Example 3.*—It is not essential that liquid-solid contact be established between monomer and polymer as in Examples 1 and 2, and a satisfactory gum is made by subjecting granular methyl methacrylate polymer to the fumes arising from a methacrylate monomer. A quantity of the monomer is placed in the lower part of a convenient receptacle such as a desiccator or a closed chamber, so constructed that a shelf or partition permeable to the monomer gas separates the two substances. Preferably the polymer is maintained at or below ordinary room temperature. The monomer being volatile at ordinary temperatures, its gas is absorbed by the polymer grains. The closed chamber is allowed to stand ten to fourteen days, or until the grains conglutinate into a gummy, coherent mass. From this the restoration is molded as in Example 1.

*Example 4.*—Grains of polymerized methyl methacrylate, into which various different colors have been incorporated, are blended, some of these grains containing pure red dyes or pigments, others containing blue, others pink, others yellow, others white, etc., until the mixture well stirred together, produces a general tone of pink resembling oral tissue. To this mixture is added the monomeric methacrylate in any of the ways described in Example 1, 2 or 3. The result is a gum of non-homogeneous color. The many constituent colors are discrete and individually visible at close inspection, but at distance, blend into a general tone. The resin is molded as in Example 1.

*Example 5.*—To transparent grains of polymerized methyl methacrylate, pigments are added and the mixture is ground in a ball-mill until the pigment particles have become superficially attached to the polymer grains. These superficially colored grains are treated with a monomer as in Examples 1, 2 and 3. The resultant gum is of a non-uniform color, and is molded as in Example 1.

*Example 6.*—To transparent or colored grains of methyl methacrylate polymer, a monomer in which color is dissolved or suspended, is added as in Examples 1 or 2. The resultant gum is non-homogeneously colored, having veinous structure and variegation similar to that of oral tissue. It is molded as in Example 1.

It will be understood that in the manufacture of oral restorations in accordance with our invention, owing to the material of which the molds are usually made, there are practical limits to the permissible temperatures and pressures employed in the molding operation. However, in the case of articles for which the molds may be made of materials more resistant to high pressures and temperatures, such pressures and temperatures may be employed without injury to the product. Thus, using metal molds in working our invention we have successfully used temperatures exceeding 150° C. and pressures up to two thousand pounds per square inch.

We claim:

1. The process of molding methacrylic acid esters which comprises adding approximately 2 to 4 parts by weight of monomeric methacrylic acid ester to approximately 8 to 6 parts by weight of granular polymeric methacrylic acid ester, permitting the ingredients to stand undisturbed until the monomer softens the grains of the polymer and stiffens forming a non-homogeneous composition having a soft rubbery consistency, molding the composition under a pressure of 150 to 250 pounds per square inch, and heating the molded composition to polymerize the monomeric ester.

2. The process of molding methacrylic acid esters which comprises admixing approximately 8 to 6 parts by weight of granular polymeric methacrylic acid ester with approximately 2 to 4 parts by weight of monomeric methacrylic acid ester, permitting the ingredients to stand undisturbed until the monomer softens the grains of the polymer and stiffens forming a non-homogeneous composition, molding the composition under a pressure of 150 to 250 pounds per square inch, and subjecting the composition to a temperature of 30° C. to 105° C. thereby polymerizing the monomeric ester.

LESTER B. VERNON.
HAROLD M. VERNON.